Dec. 9, 1924.   1,518,372
W. J. TWISS
HORSESHOE
Filed Oct. 1, 1923
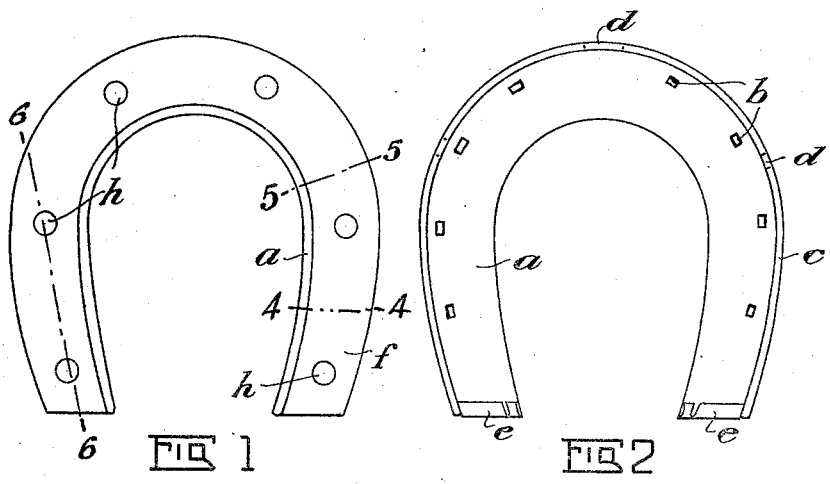
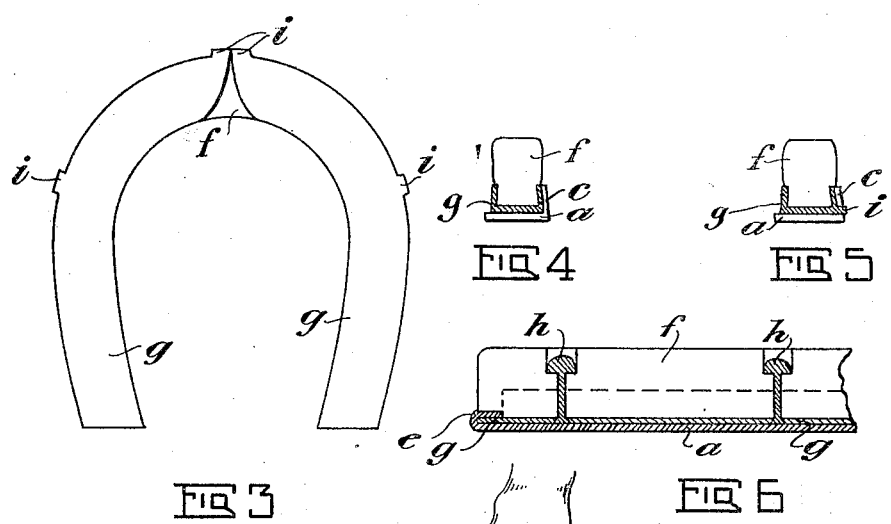
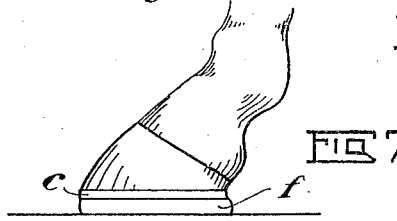
William John Twiss
Inventor Patented Dec. 9, 1924.

1,518,372

UNITED STATES PATENT OFFICE.

WILLIAM JOHN TWISS, OF HIGH RIVER, CANADA.

HORSESHOE.

Application filed October 1, 1923. Serial No. 665,944.

*To all whom it may concern:*

Be it known that I, WILLIAM JOHN TWISS, a subject of the King of Great Britain and Ireland, and residing at High River, in the Province of Alberta, in the Dominion of Canada, have invented a certain new and useful Improvement in Horseshoes, of which the following is a specification.

My invention relates to improvements in a horseshoe, the objects of which are, first, to provide a shoe that will give great adhesion with road surfaces; second, one that will have a resilient substance incorporated with the shoe that will eliminate shock due to hard surfaces; and third, to provide a means for quickly and easily securing or demounting the resilient member from the base plate for renewal purposes.

These and other objects and the manner of their accomplishment will be apparent from the following description, reference being had to the accompanying drawing in which—

Fig. 1 is a plan view of the contact surface made of resilient material as it will be held in the base plate;

Fig. 2 is a plan of the base plate with the resilient member removed therefrom;

Fig. 3 is a bottom plan view showing the metallic mounting for the resilient member;

Fig. 4 is a cross-section on the line 4—4 of Fig. 1;

Fig. 5 is a cross-section on the line 5—5 of Fig. 1;

Fig. 6 is a section on the line 6—6 of Fig. 1, showing the method of securing the resilient substance to the base plate; and Fig. 7 is a view of a horse's hoof from the side, showing the complete shoe secured thereto.

Similar characters refer to similar parts throughout the several views.

A base plate $a$ is secured by nails through the holes $b$ to the hoof of a horse. This base plate has a flange $c$, around the outer edge substantially at right angles to the said plate, through which flange are orifices $d$. The rear ends of the base plate $a$ are turned over to form a slot as shown at $e$. A resilient member $f$, of a springy substance such as rubber, is secured to sectional backing members $g$ by rivets $h$, the said backing members being in two parts made trough-shaped to fit inside the flange $c$, rest upon the base plate $a$, and hold the resilient member $f$ in place.

The sectional members $g$ are provided with lugs $i$ which engage the orifices $d$ in the flange $c$ of the base plate $a$, within which they are held by the outward spring of the resilient member $f$, and the rear ends of the sectional members engaging within the slots $e$ formed on the ends of the base plate $a$, are prevented from backward movement. When in place the slots $e$ are closed by hammering to prevent the escape of the sectional members $g$.

What I claim is:

1. In a horseshoe, the combination of a flanged base plate with means for securing the same to a hoof and having orifices at intervals around the flange of the said base plate, and a resilient member mounted upon sectional members with lugs thereon for engagement within the said orifices in the flange of the base member, all substantially as descrbied.

2. In a horseshoe, the combination of a base plate with means for securing the same to a hoof, turned-up ends formed upon the said base plate and a flange around the exterior edge thereof, and having a plurality of orifices through the said flange, a resilient member mounted upon sectional members with lugs thereon for engagement within the said orifices in the flange of the base member, and extension ends upon the said sectional members for engagement in the slots formed by the turned-up ends of the base plate, all substantially as described.

3. In a horseshoe, the combination of a base plate with means for securing the same to a hoof, turned-up ends formed upon the said base plate and a flange around the exterior edge thereof, and having a plurality of orifices through the said flange, a resilient member mounted upon sectional members with lugs thereon for engagement within the said orifices in the flange of the base member, and extension ends upon the said sectional members for engagement and securing in the slots formed by the turned-up ends of the base plate, all substantially as described.

WILLIAM JOHN TWISS.

Witnesses:
COLIN F. L. HESELTINE,
HERBERT L. SPANKIE.